United States Patent
Lin (10) Patent No.: US 10,566,869 B2
(45) Date of Patent: Feb. 18, 2020

(54) THREE-PHASE BRUSHLESS FAN (71) Applicant: Global WIN Technology Co., Ltd., Taipei (TW)

(72) Inventor: Shih-Jen Lin, Taipei (TW)

(73) Assignee: GLOBAL WIN TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 16/285,310

(22) Filed: Feb. 26, 2019

(65) Prior Publication Data

US 2019/0190339 A1 Jun. 20, 2019

Related U.S. Application Data

(63) Continuation-in-part of application No. 15/293,842, filed on Oct. 14, 2016, now Pat. No. 10,243,428.

(51) Int. Cl.
*H02K 9/00* (2006.01)
*H02K 3/26* (2006.01)
*H02K 5/20* (2006.01)
*H02K 9/06* (2006.01)
*H02K 11/33* (2016.01)
*F04D 25/06* (2006.01)
*H02K 21/24* (2006.01)
*F04D 17/16* (2006.01)

(52) U.S. Cl.
CPC ........... *H02K 3/26* (2013.01); *F04D 25/0606* (2013.01); *F04D 25/0646* (2013.01); *F04D 25/0653* (2013.01); *H02K 5/20* (2013.01); *H02K 9/06* (2013.01); *H02K 11/33* (2016.01); *H02K 21/24* (2013.01); *F04D 17/16* (2013.01); *H02K 2203/03* (2013.01); *H02K 2205/09* (2013.01); *H02K 2211/03* (2013.01)

(58) Field of Classification Search
CPC ........ H02K 11/215; H02K 11/33; H02K 1/02; H02K 1/14; H02K 1/146; H02K 1/27; H02K 3/522; H02K 5/08; H02K 7/003; H02K 7/14; H02K 9/06; H02K 21/24; F04D 25/0613; F04D 29/626
USPC ..................................................... 310/60 R
See application file for complete search history.

(56) References Cited

U.S. PATENT DOCUMENTS

| 7,619,337 | B2 | 11/2009 | Kasai et al. |
| 8,177,530 | B2 | 5/2012 | Horng et al. |
| 9,551,348 | B2 | 1/2017 | Lin et al. |
| 10,107,304 | B2 | 10/2018 | Tsai et al. |
| 10,177,633 | B2 * | 1/2019 | Shrestha ................ H02K 21/14 |

(Continued)

*Primary Examiner* — Jianchun Qin
(74) *Attorney, Agent, or Firm* — Muncy, Geissler, Olds & Lowe, P.C.

(57) ABSTRACT

A three-phase brushless fan is disclosed. In the three-phase brushless fan, an outer shell member includes an axis part, and winding columns are disposed around the axis part, and the rotating module includes a fan, an axis coupling part pivoted to the axis part, and a magnetic element having south and north magnetic portions; a circuit board electrically connected to coils formed by winding a conductive wire on the winding columns. The number of the coils is three or a multiple of three, and the number of the coils is not equal a total amount of the south and north magnetic portions. As a result, winding the conductive wire to form the multiple coils can omit the operation of placing coils on the circuit board and save labor cost in welding two head ends of conductive wires on the circuit board one by one.

11 Claims, 5 Drawing Sheets

(56) References Cited

U.S. PATENT DOCUMENTS

2018/0233989 A1* 8/2018 Ishida .................... H02K 3/522
2019/0131852 A1* 5/2019 Li .......................... H02K 9/22

* cited by examiner

THREE-PHASE BRUSHLESS FAN

This application is a Continuation-In-Part of application Ser. No. 15/293,842, filed on Oct. 14, 2016, for which priority is claimed under 35 U.S.C. § 120, the entire contents of which are hereby incorporated by reference.

BACKGROUND OF THE INVENTION

1. Field of the Invention

The present invention relates to a three-phase brushless fan, and more particularly to a three-phase brushless fan comprising a plurality of winding columns which are disposed on a winding part of a circuit module and wound with at least one conductive wire to form three or a multiple of three coils, so that the operations of placing multiple coils on the circuit board and welding two head ends of the multiple conductive wires on the circuit board one by one can be omitted, thereby reducing defect rate and assembly costs.

2. Description of the Related Art

Electronic devices such as notebook computers, desktop computers, tablet computers or smart phones usually generate heat during operation, so most of the electronic devices are equipped with single-phase brushless motor fans for heat dissipation. However, the single-phase brushless motor fan has some drawbacks.

First, a Hall sensor for sensing magnetic field is placed below a rotor of the single-phase brushless motor fan, so it is hard to make the fan thinner because of the Hall sensor occupying space.

Secondly, the single-phase brushless motor fan usually causes larger torque ripple, so vibration and noise are easily occurred during operation of the fan.

Thirdly, in order to avoid dead point when the single-phase brushless motor fan starts, the single-phase brushless motor fan must have appropriate cogging torque, but the cogging torque easily causes vibration and excessively-high startup voltage, so it takes a lot of man-hours and manpower to test the single-phase brushless motor fans during mass production.

Therefore, in order to solve the above-mentioned drawbacks of the single-phase brushless motor fan, the fan manufacturers developed a three-phase brushless motor fan with excellent characteristics of no starting dead point and low-torque ripple. However, during the conventional process of connecting the multiple coils of the three-phase brushless motor fan on the circuit board, an enamel insulated wire is wound on external objects to form a plurality of coils, and then the coils are then welded one by one on the circuit board. The process is quite complicated, and the welding operation fails easily and spends a lot of manpower and time, so the defect rate and assembly cost of the three-phase brushless fan are increased. Therefore, how to solve the problem that the complicated processes of manufacturing the coils and assembling the coils on the circuit board increase the defect rate and assembly cost of the conventional three-phase brushless motor fan, is an important issue in the industry.

SUMMARY OF THE INVENTION

In order to solve aforementioned problems and drawbacks, the inventor develops a three-phase brushless fan structure according to related data, multiple tests and modifications, and years of experience in the industry.

An objective of the present invention is that, in a three-phase brushless fan, an outer shell member comprises an axis part disposed on a bottom surface of a receiving groove, and a plurality of winding columns of a winding part are disposed around the axis part, and a fan of a rotating module is accommodated in the receiving groove, and an axis coupling part is pivoted to the axis part on a side of the fan, a magnetic element includes at least one set of south magnetic portions with south magnetic pole and north magnetic portions with north magnetic pole staggered in arrangement and disposed around the axis coupling part, a circuit board of a circuit module is accommodated in the receiving groove, the circuit board is electrically connected to a plurality of coils formed by winding at least one conductive wire on the plurality of winding columns, the number of the coils is three or a multiple of three, and the number of the coils is not equal a total amount of the south magnetic portions and the north magnetic portions, an driving element is electrically connected to a surface of the circuit board, at least four metal contacts (U, V, W, ground) are disposed on the surface of the circuit board and configured for electrical connection with the coils, so that winding the at least one conductive wire to form the coils can omit the steps of placing the plurality of coils on the circuit board and welding two head ends of multiple conductive wires on the circuit board one by one, thereby achieving the purpose of reducing defect rate and assembly cost.

Another objective of the present invention is that a seat body of the three-phase brushless fan is formed by a metal seat and a plastic outer frame, the metal seat can increase the overall structural strength of the seat body, so as to prevent the seat body from being bent to deform during rotation of the fan of the rotating module, thereby achieving the purpose of smoothing rotation of the fan.

Another objective of the present invention is that the circuit board is electrically connected to a driving element through a side plate thereof, so that the driving element can be spaced apart from the coins by the side plate, to prevent affecting the operation of winding the at least one conductive wire on the winding columns to form the coils, and the driving element spaced apart from the coils does not affect assembly of the fan, so the fan does not need to increase the height thereof for accommodating the thickness of the driving element. As a result, the overall height of the fan can be lowered, and the purpose of making the three-phase brushless fan thinner can be achieved.

DETAILED DESCRIPTION OF THE PREFERRED EMBODIMENTS

Figure 1:
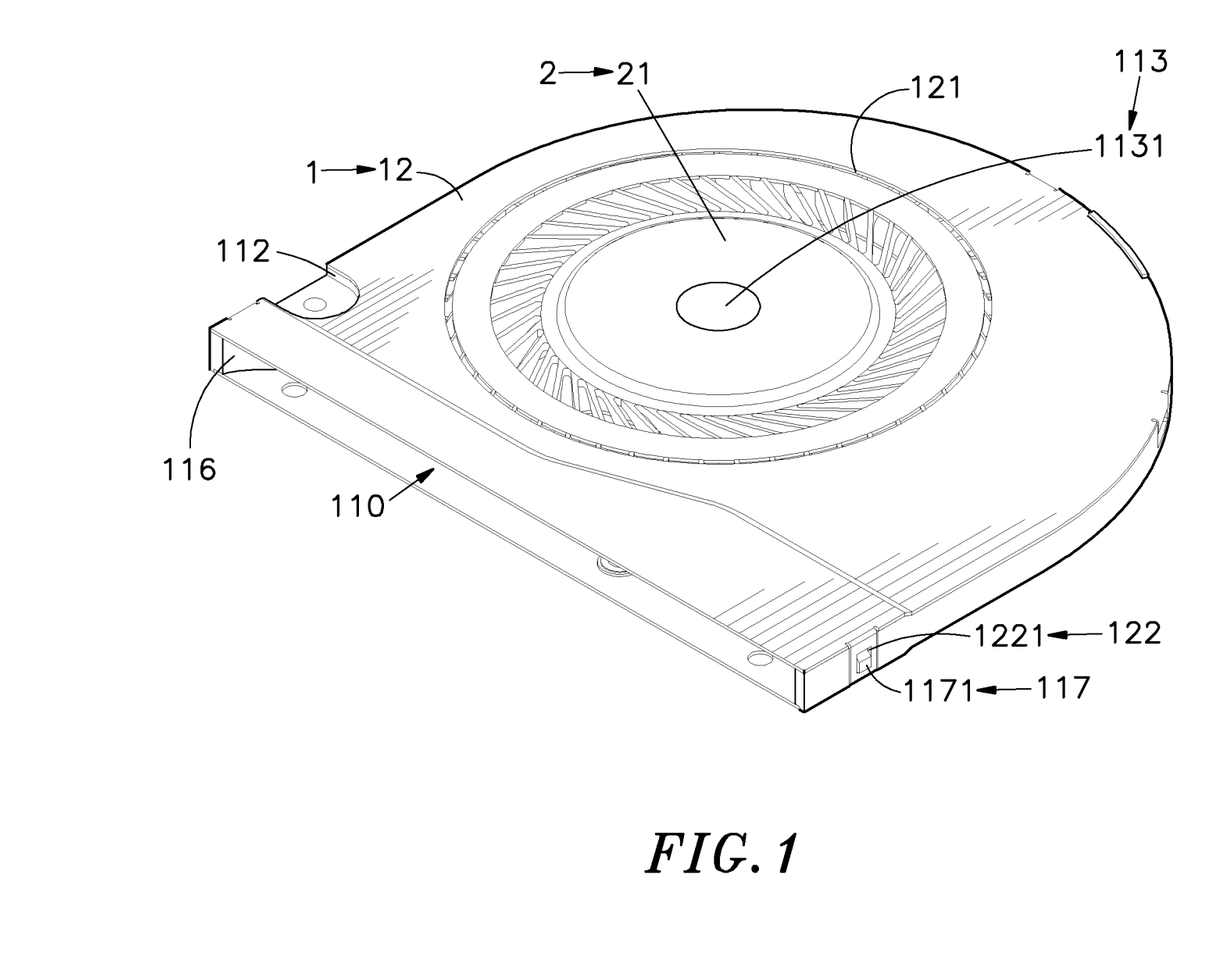
FIG. 1 is an elevational view of a three-phase brushless fan of the present invention.
Figure 2:
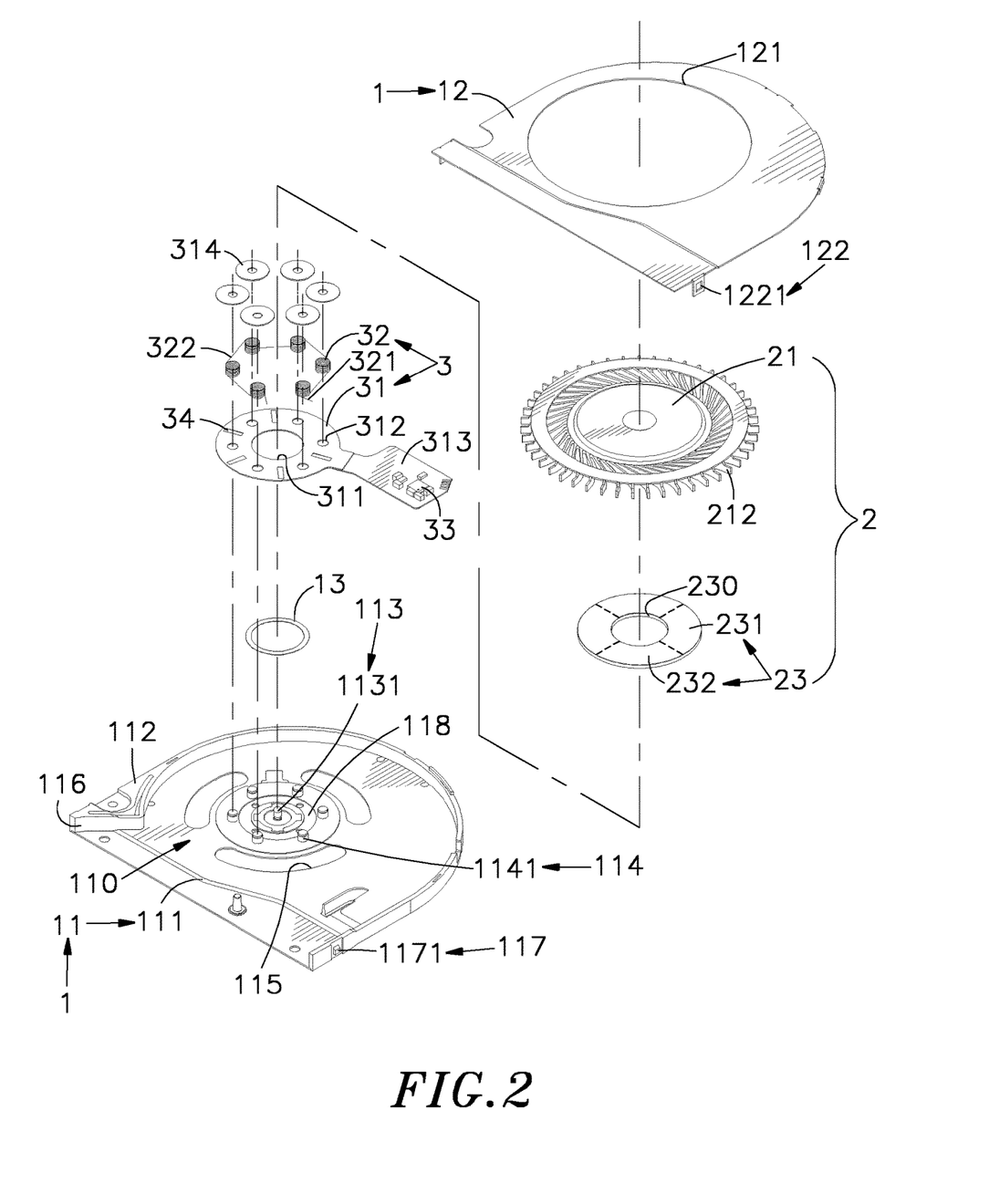
FIG. 2 is a perspective exploded view of a three-phase brushless fan of the present invention.
Figure 3:
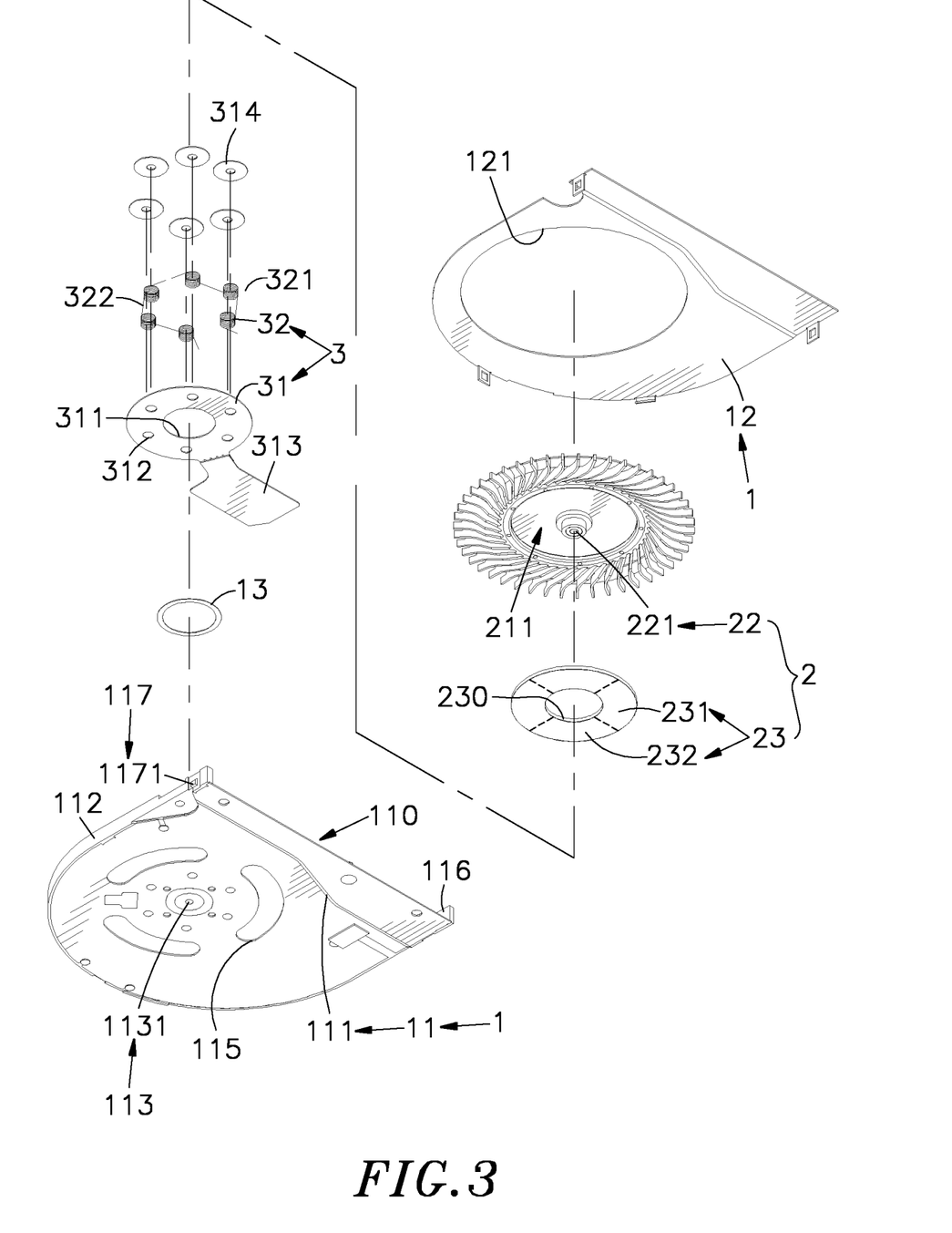
FIG. 3 is a perspective exploded view of a three-phase brushless fan of the present invention, when viewed from another angle.
Figure 4:
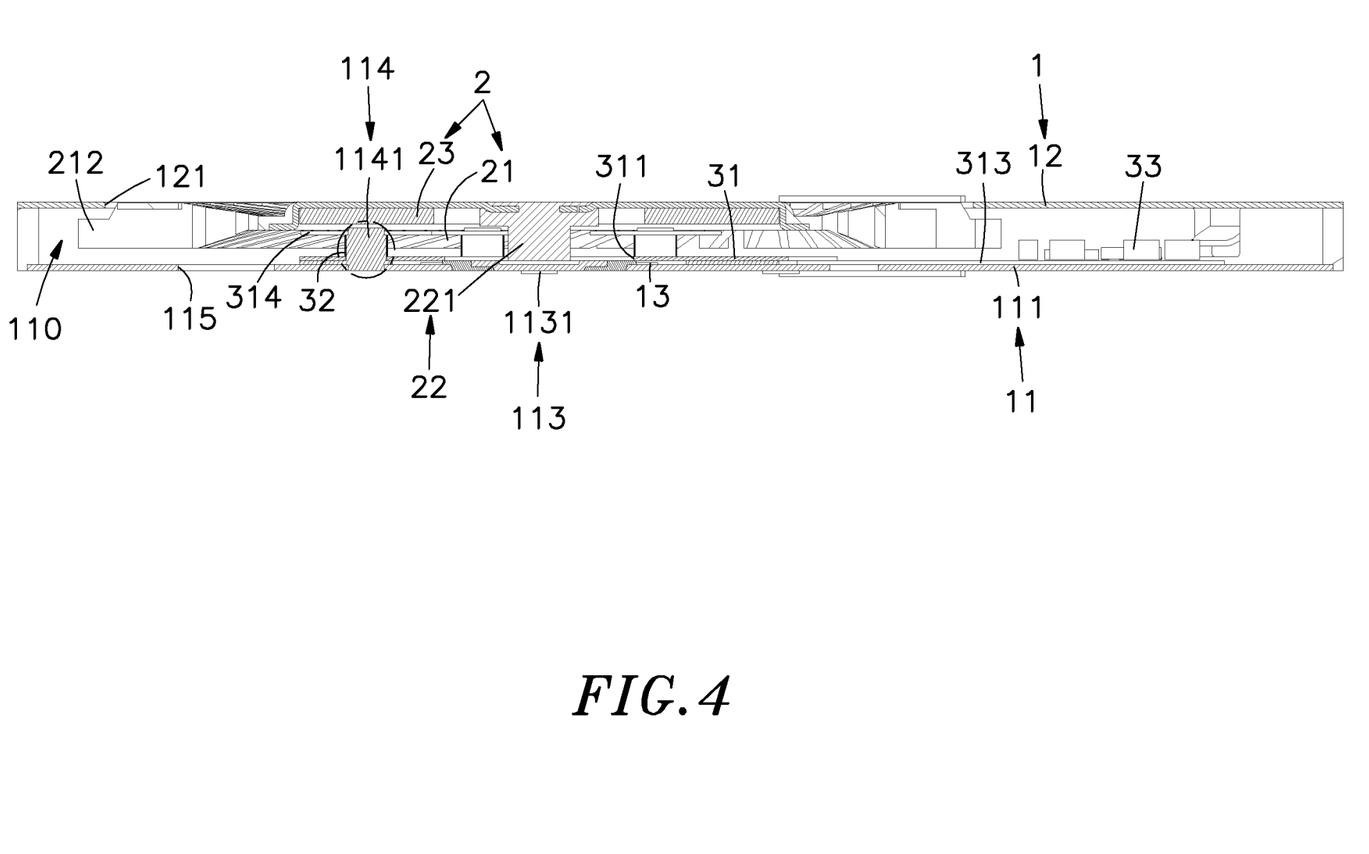
FIG. 4 is a sectional side view of a three-phase brushless fan of the present invention.
Figure 5:
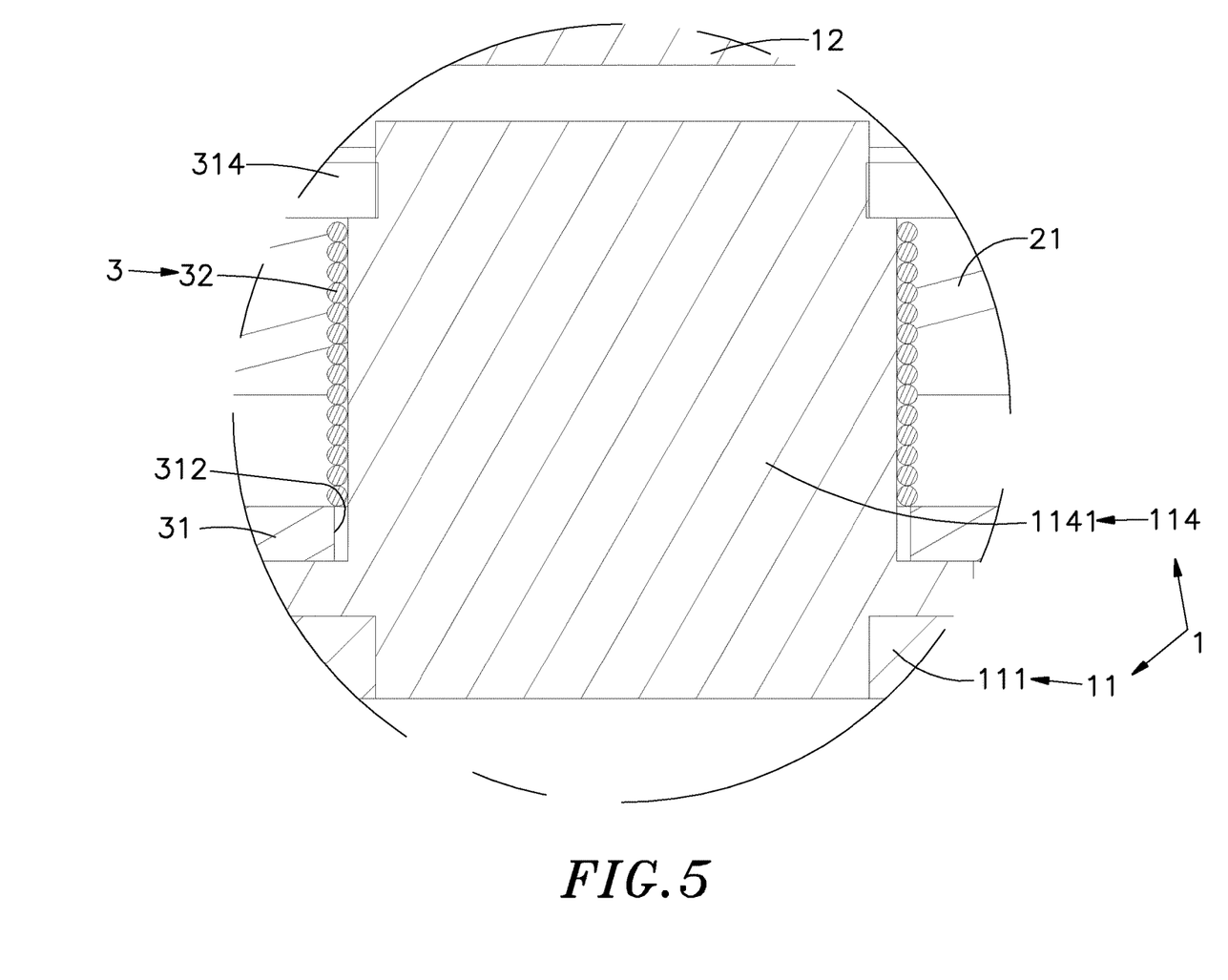
FIG. 5 is an enlarged view of a part of FIG. 4.

Please refer to FIGS. 1 to 5, which are a perspective view, an exploded perspective view, an exploded perspective view when viewed from another angle, a sectional side view and an enlarged view of a part of FIG. 4, according to a three-phase brushless fan of the present invention. As shown in FIGS. 1 to 5, the fan of the present invention can be a three-phase (U, V, W) brushless fan, and comprise an outer shell member 1, a rotating module 2 and a circuit module 3.

The outer shell member 1 can comprise a seat body 11, a lid 12 and a magnetically-permeable member 13. The seat body 11 can comprise a metal seat 111, a plastic outer frame 112 assembled on the metal seat 111, a receiving groove 110 recessed on a surface thereof, and an axis part 113 disposed on a bottom of the receiving groove 110. The axis part 113 has a shaft core 1131 protruded on a central portion of the bottom of the receiving groove 110. A winding part 114 is arranged around the axis part 113, and comprises a plurality of winding columns 1141 disposed around and surrounding the axis part 113. The receiving groove 110 is formed with a plurality of first vents 115 around the winding part 114, and an opening 116 formed on a sidewall thereof and cut therethrough outwardly. The seat body 11 can have a connection part 117 disposed on an outer wall surface thereof and having a plurality of buckles 1171 protruded on an outer wall surface of the seat body 11. The receiving groove 110 is provided with a ring-shaped recess 118 formed on a bottom surface thereof and between the axis part 113 and the winding part 114.

The lid 12 is combined on the seat body 11, and has a second vent 121 cut through a surface thereof, and a positioning part 122 disposed on a periphery thereof and configured to fasten the connection part 117. The positioning part 122 has a plurality of buckle plates 1221 bent from a periphery of the lid 12 and configured to buckle the plurality of buckles 1171. Furthermore, the magnetically-permeable member 13 is fixed inside the recess 118.

The rotating module 2 can comprise a fan 21, an axis coupling part 22 and a magnetic element 23. The fan 21 is accommodated in the receiving groove 110 of the seat body 11, and the fan 21 has a connecting groove 211 recessed on a side surface thereof, and a plurality of fan blades 212 surrounding a peripheral thereof and arranged adjacent to each other. The axis coupling part 22 is disposed in the connecting groove 211 and configured to pivotally connect to the axis part 113, and the axis coupling part 22 has an axis coupling groove 221 recessed inside thereof and configured to pivotally connect to the shaft core 1131. The magnetic element 23 is annularly disposed around the axis coupling part 22 and in the connecting groove 211, the magnetic element 23 is provided with a through hole 230 formed at a central portion thereof and configured for insertion of the axis coupling part 22, and has at least one set of south magnetic portions 231 with south magnetic pole and north magnetic portions 232 with north magnetic pole staggered in arrangement and formed by magnetization manner.

The circuit module 3 can comprise a circuit board 31, a plurality of coils 32 and a driving element 33. The circuit board 31 is provided with a through hole 311 cut through a surface thereof and configured for insertion of the axis coupling part 22, and a plurality of position-limiting holes 312 formed around the through hole 311 and configured for insertion of the plurality of winding columns 1141, respectively, and a side plate 313 outwardly extended from a side of the circuit board 31. A plurality of position-limiting plates 314 are disposed correspondingly in position to the plurality of position-limiting holes 312 and configured to mount the plurality of winding columns 1141, and at least one conductive wire is directly wound on the plurality of winding columns 1141, which are inserted out of the plurality of position-limiting holes 312, to form three or a multiple of three coils 32. The at least three coils 32 have two head ends 321 disposed on two ends thereof, and a connection section 322 formed between at least two coils. The driving element 33 is electrically connected to a surface of the side plate 313 of the circuit board 31 and configured to convert DC power into three-phase (U, V, W) current and provide the plurality of coils 32 with the three-phase current. At least four metal contacts 34 are disposed around the through holes 311 on the surface of the circuit board 31 and configured to electrically connect to the plurality of coils 32. The four metal contacts 34 are U-phase, V-phase, W-phase and ground metal contacts 34.

Preferably, the plastic outer frame 112 and the plurality of winding columns 1141, which are made of plastic material, can be formed on the metal seat 111 of the seat body 11 of the outer shell member 1 by injection molding manner. However, in practical application, the plastic outer frame 112 and the plastic winding columns 1141 can also be formed by combining or assembling manner, such as engaging structures, buckle structures. Furthermore, the seat body 11 can also be made by plastic material integrally, or formed by separate plastic members.

Furthermore, in a preferred embodiment of the present invention, the recess 118 of the seat body 11 is formed on the bottom surface of the receiving groove 110, and the magnetically-permeable member 13 can be fastened with the recess 118. However, in practical application, the recess 118 can be formed on a bottom surface of the seat body 11, so that the magnetically-permeable member 13 can be mounted on a back surface of the seat body 11.

The magnetic element 23 of the rotating module 2 can comprise the at least one set of the south magnetic portions 231 with south magnetic pole and the north magnetic portions 232 with north magnetic pole staggered in arrangement, and the number of the coils 32 of the circuit module 3 can be three or a multiple of three, but the number of the coils 32 of the circuit module 3 is not equal to a total amount of the south magnetic portions 231 and the north magnetic portions 232 of the magnetic element 23. For example, when the number of the coils 32 of the circuit module 3 is six, the magnetic element 23 cannot have three sets of the south magnetic portions 231 and the north magnetic portions 232, because the three sets of south magnetic portions 231 and north magnetic portions 232 have six magnetic portions of which the number is equal to the number of the coils 32. The preset circuit layout on the circuit board 31 and the driving element 33 of the circuit module 3 can be the circuit layout of a three-phase brushless motor and a driving chip, respectively. As a result, the outer shell member 1, the rotating module 2 and the circuit module 3 can construct the three-phase brushless fan.

In a preferred embodiment of the present invention, the seat body 11 of the outer shell member 1 and the positioning part 122 of the lid 12 can be assembled integrally through the connection part 117; however, in practical application, the seat body 11 can also be assembled with the lid 12 by using glue, melting manner, engaging structure, or other combining or assembling manner.

Furthermore, the circuit board 31 of the circuit module 3 is provided with the preset circuit layout formed on a surface thereof. The two head ends 321 of the coils 32, the connection sections 322 and the driving element 33 can be electrically connected to the circuit board 31 by welding manner, such as surface mount technology (SMT) or through hole welding manner.

In a preferred embodiment of the present invention, the axis part 113 of the seat body 11 of the outer shell member 1 can have the shaft core 1131, and the axis coupling part 22 of the rotating module 2 has the axis coupling groove 221 recessed inside thereof and configured to pivotally connect to the shaft core 1131, so that the fan 21 of the rotating module 2 can be rotated on the axis part 113 through the axis coupling part 22. However, in practical application, the positions of the axis part 113 of the seat body 11 and the axis coupling part 22 of the rotating module 2 can be interchanged. For example, the axis coupling groove can be disposed on the seat body 11, and the shaft core can be disposed on the fan 21, but this configuration is not shown figures. As a result, the fan 21 can be rotated in the seat body 11.

In a preferred embodiment of the present invention, the circuit board 31 of the circuit module 3 has the side plate 313 extended outwardly from the side thereof, and the driving element 33 of the circuit module 3 is disposed on the surface of the side plate 313. However, in practical application, the circuit board 31 of the circuit module 3 and the side plate 313 can be combined integrally, and the driving element 33 can be disposed on the surface of the circuit board 31.

In practical application, the three-phase brushless fan of the present invention can be installed in a computer, a notebook computer, a mobile phone, a micro projector, a small UAV or other preset electronic device, which is not shown in figures. The circuit board 31 of the circuit module 3 can be electrically connected to an external power supply, such as a power supply in the notebook computer, which is not shown in figures. The three-phase brushless fan can be used for heat dissipation. When the circuit board 31 of the circuit module 3 is powered on, the driving element 33 on the side plate 313 of the circuit board 31 can drive the plurality of coils 32 to generate an alternating magnetic field, so that the plurality of coils 32 can alternately attract and repel the at least one set of the south magnetic portions 231 with south magnetic pole 231 and the north magnetic portions 232 with north magnetic pole of the magnetic element 23, respectively, so as to drive the fan 21 to rotate, thereby performing heat dissipation for the preset electronic device.

When the fan 21 of the rotating module 2 is rotated, the plurality of first vents 115 of the seat body 11 and the second vents 121 of the lid 12 can serve as air inlets, and the opening 116 on the side of the seat body 11 can serve as an air outlet, so that the three-phase brushless fan can perform a side blowing function similar to a blower. However, in practical application, the plurality of first vents 115 of the seat body 11 can serve as the air outlet and the second vents 121 of the lid 12 can serve as the air inlet, and the usage of the opening 116 can be omitted. Furthermore, the plurality of fan blades 212 of the fan 21 can be turned to form axial-flow fan blades 212, so as to form a structure of an axial-flow fan, which is not shown in figures, thereby implementing a longitudinal blowing function.

The three-phase brushless fan of the present invention can have following advantages.

First, the plurality of winding columns 1141 disposed on the winding part 114 of the circuit module 3 are wound with the at least one conductive wire to form the three or a multiple of three coils 32, and these structures of the plurality of coils 32, and the winding manner can omit the operation of placing the plurality of coils 32 on the circuit board 31, and reduce the number of the head ends 321, and it does not need to weld two head ends 321 of multiple conductive wires one by one on the circuit board 31, thereby reducing the defect rate and assembly cost.

Secondly, the seat body 11 is formed by the metal seat 111 and the plastic outer frame 112, the metal seat 111 can increase the overall structural strength of the seat body 11, so as to prevent the seat body 11 from being bent to deform when the fan 21 of the rotating module 2 is rotating, thereby enabling the fan 21 to smoothly rotate.

Thirdly, the circuit board 31 of the circuit module 3 has the side plate 313 disposed on the side thereof, and the driving element 33 is disposed on and electrically connected to the surface of the side plate 313, so that, with the configuration of the side plate 313, the driving element 33 can be spaced apart from the plurality of coils 32, so as to avoid affecting the operation of winding the at least one conductive wire on the plurality of winding columns 1141 to form the plurality of coils 32; since the driving element 33 is spaced apart from the plurality of coils 32 by a distance, the driving element 33 does not affect the assembly of the fan 21, and the fan 21 does not need to increase the height thereof to accommodate the thickness of the driving element 33, so that the three-phase brushless fan can have reduced height to become thinner.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A three-phase brushless fan comprising an outer shell member, a rotating module and a circuit module, wherein the outer shell member comprises a receiving groove formed inside thereof, and an axis part formed on a bottom of the receiving groove, and a winding part disposed around the axis part, and the winding part comprises a plurality of winding columns disposed around the axis part;
wherein the rotating module comprises a fan accommodated in the receiving groove, and an axis coupling part disposed at a side of the fan and configured to pivotally connect to the axis part, and a magnetic element disposed around the axis coupling part, and the magnetic element comprises at least one set of south magnetic portions with south magnetic pole and north magnetic portions with north magnetic pole staggered in arrangement;
wherein the circuit module comprises a circuit board, a plurality of coils and a driving element, the circuit board is accommodated in the receiving groove of the outer shell member, and the circuit module comprises three or a multiple of three coil formed by winding at least one conductive wire on the plurality of winding columns, and the number of the coils is not equal a total amount of the south magnetic portions with south magnetic pole and the north magnetic portions with north magnetic pole, the driving element is electrically connected to a surface of the circuit board and configured to convert DC power into three-phase current and provide the three-phase current to the coils, and at least four metal contacts are disposed on the surface of the circuit board and configured to electrically connect to the coils.

2. The three-phase brushless fan according to claim 1, wherein the outer shell member comprises a seat body, and the seat body has the receiving groove recessed on a surface thereof, and a lid disposed on a top side of the receiving groove of the seat body.

3. The three-phase brushless fan according to claim 2, wherein the seat body is formed with a plurality of first vents disposed in the receiving groove and around a winding part, and the receiving groove of the seat body is formed with an opening outwardly cut through a sidewall thereof, and the lid is formed with a second vent cut through a surface thereof.

4. The three-phase brushless fan according to claim 2, wherein the seat body comprises a metal seat, and a plastic outer frame assembled on the metal seat.

5. The three-phase brushless fan according to claim 2, wherein the seat body comprises a connection part disposed on an outer wall surface thereof and comprising a plurality of buckles protruded on the outer wall surface of the seat body, and the lid comprises a positioning part disposed on a periphery thereof and configured to position with the connection part, and the positioning part has a plurality of buckle plates bent from a periphery thereof and configured to buckle with the plurality of buckles.

6. The three-phase brushless fan according to claim 1, wherein the axis part of the outer shell member has a shaft core protruded on a central portion of the bottom of the receiving groove, and the axis coupling part of the rotating module has an axis coupling groove recessed inside thereof and configured to pivotally connect to the shaft core.

7. The three-phase brushless fan according to claim 1, wherein the receiving groove of the outer shell member is formed with a recess located on the bottom surface thereof and between the axis part and the winding part, and the three-phase brushless fan further comprises a magnetically-permeable member disposed inside the recess.

8. The three-phase brushless fan according to claim 1, wherein the fan of the rotating module has a connecting groove recessed on a side surface thereof and configured to accommodate the magnetic element, and the connecting groove is formed with the axis coupling part located at central portion thereof, and the magnetic element has a through hole formed at a central portion thereof and configured for insertion of the axis coupling part.

9. The three-phase brushless fan according to claim 1, wherein the circuit board of the circuit module is formed with a through hole cut through a surface thereof and configured for insertion of the axis coupling part, and a plurality of position-limiting holes formed around the through hole and configured for insertion of the plurality of winding columns, and three-phase brushless fan further comprises a plurality of position-limiting plates disposed above the circuit board and correspondingly in position to the plurality of position-limiting holes and configured to mount the plurality of winding columns.

10. The three-phase brushless fan according to claim 1, wherein the circuit board of the circuit module comprises a side plate extended outwardly from a side thereof, and the driving element is disposed on and electrically connected to the side plate.

11. The three-phase brushless fan according to claim 1, wherein the at least three coils have two head ends disposed at two ends thereof and electrically connected to the circuit board, and a connection section formed between at least two coils.

* * * * *